United States Patent [19]
Nishijima et al.

[11] Patent Number: 5,812,340
[45] Date of Patent: Sep. 22, 1998

[54] MAGNETIC TAPE RECORDING AND REPRODUCING PLUG-IN UNIT

[75] Inventors: Tatsumi Nishijima, Hiratsuka; Kyuichirou Nagai, Fujisawa; Kenmei Masuda, Yokohama; Nobuyuki Kaku, Kanagawa, all of Japan

[73] Assignee: Hitachi, Ltd., Tokyo, Japan

[21] Appl. No.: 816,057

[22] Filed: Mar. 11, 1997

Related U.S. Application Data

[63] Continuation of Ser. No. 402,811, Mar. 13, 1995, abandoned.

[30] Foreign Application Priority Data

Mar. 17, 1994 [JP] Japan ..................................... 6-046717

[51] Int. Cl.⁶ ........................... G11B 5/008; G11B 15/00; G11B 17/00
[52] U.S. Cl. ............................................. 360/96.5; 360/95
[58] Field of Search .......................... 360/96.5, 95, 96.1, 360/90

[56] References Cited

U.S. PATENT DOCUMENTS

| 4,031,557 | 6/1977 | Ban et al. | 360/96.5 |
|---|---|---|---|
| 5,025,334 | 6/1991 | Perona et al. | 360/96.5 |
| 5,034,833 | 7/1991 | Marlowe | 360/96.5 |
| 5,062,099 | 10/1991 | Odawara et al. | 369/247 |
| 5,103,357 | 4/1992 | Nakanishi | 360/96.5 |
| 5,293,550 | 3/1994 | Toyoguchi et al. | 360/96.5 |
| 5,315,460 | 5/1994 | Takeda et al. | 360/95 |
| 5,321,565 | 6/1994 | Shibaike et al. | 360/96.5 |
| 5,513,053 | 4/1996 | Kurokawa | 360/96.5 |

FOREIGN PATENT DOCUMENTS

| 0452149 A2 | 10/1991 | European Pat. Off. . |
|---|---|---|
| 59-104751 | 6/1984 | Japan . |
| 60-74145 | 6/1985 | Japan . |
| 62-128055 | 6/1987 | Japan . |
| 59-65966 | 4/1989 | Japan . |
| 59-139166 | 8/1994 | Japan . |

Primary Examiner—Tom Thomas
Assistant Examiner—Adriana Giordana
Attorney, Agent, or Firm—Fay, Sharpe, Beall, Fagan, Minnich & McKee

[57] ABSTRACT

A magnetic tape recording and reproducing plug-in unit including a case with a front plate having an insertion opening through which a magnetic tape cassette is inserted, a bottom plate, a top plate, and a pair of side plates each formed with a pair of guide slots arranged for guiding the cassette to a loading position. The slide plates are attached to the side plates so as to be slidable within the case, each slide plate formed with a pair of cam slots arranged for moving the cassette to the loading position. A cassette holder is disposed inside the pair of slide plates for holding the cassette and has pins extending through the cam slots into the guide slots of the side plates. A recording and reproducing device is mounted on the bottom plate. A driving device drives the slide plates. An electronic circuit is disposed at the rear of the recording and reproducing device. Each of the guide slots has a horizontal guide slot portion extending depthwise and a vertical guide slot portion extending downward from the horizontal guide slot portion. Each of the cam slots has a horizontal cam slot portion extending depthwise and an oblique cam slot portion extending obliquely upwards from a rear end of the horizontal cam slot portion.

15 Claims, 16 Drawing Sheets

MAGNETIC TAPE RECORDING AND REPRODUCING PLUG-IN UNIT

This is a continuation of U.S. application Ser. No. 08/402,811 filed Mar. 13, 1995 now abandoned.

BACKGROUND OF THE INVENTION

The present invention relates generally to a magnetic tape recording and reproducing plug-in unit which is to be used by insertion into an opening of a data recorder and the like, and more particularly to a magnetic tape recording and reproducing plug-in unit of the front loading type in which a magnetic tape cassette, having a magnetic tape contained in a cassette of the VTR cassette type, is inserted into the plug-in unit from the front thereof.

With the advance of downsizing of computers, there are increasing demands for making smaller data recorders which are used for backup of the computers and so on. As a matter of course, there are also demands for making smaller magnetic tape recording and reproducing plug-in units which are to be used by insertion into the opening of the data recorder.

Accordingly, an object of the present invention is to provide a small-sized magnetic tape recording and reproducing plug-in unit which is to be used by insertion into an opening of a data recorder.

SUMMARY OF THE INVENTION

A magnetic tape recording and reproducing plug-in unit according to the present invention comprises a case comprising a front plate having an insertion opening through which a magnetic tape cassette is inserted, a bottom plate and a pair of side plates each formed with a pair of guide slots arranged in a depthwise direction for guiding the cassette from an inserting position to a loading position; a pair of slide plates attached to the pair of side plates so as to be slidable in the depthwise direction within the case, each slide plate being formed with a pair of cam slots arranged in the depthwise direction for moving the cassette from the inserting position to the loading position in cooperation with the guide plots, and having a rack formed at an edge thereof; a cassette holder disposed inside the pair of slide plates for holding the magnetic tape cassette inserted into the insertion opening, and having pins extending through the cam slots of the slide plates into the guide slots of the side plates; a recording and reproducing means comprising a rotary magnetic cylinder, a plurality of pins and a pair of reel mounts, and mounted on the bottom plate; a driving means comprising a motor and a gear train connecting drivingly between the motor and the racks of the slide plates, and disposed at the rear of the recording and reproducing means for driving the pair of slide plates in the depthwise direction; and an electronic circuit means comprising a connection terminal to the data recorder and disposed at the rear of the recording and reproducing means, wherein each of the pair of guide slots formed in the side plates of the case has a horizontal guide slot portion extending in the depthwise direction of the case and a vertical guide slot portion extending downward from a rear end of the horizontal guide slot portion; and wherein each of the pair of cam slots has a horizontal cam slot portion extending in the depthwise direction of the case and an oblique cam slot portion extending obliquely upwards from a rear end of the horizontal cam slot portion.

The case is 102 mm or less in width and 42 mm or less in height.

In an embodiment of the plug-in unit according to the invention, a rear guide slot of the pair of guide slots is further formed in the horizontal guide slot portion thereof with a convex guide slot portion which is convex upwardly and connected to the vertical guide slot portion, and a connecting point between the convex guide slot portion and the vertical guide slot portion is located below the level of a lower surface of the horizontal guide slot portion, and the pair of cam slots each have a vertical cam slot portion extending upwards from an end of the oblique cam slot portion, and widths of the vertical cam slot portions are different from each other.

The guide pins, which are higher than the reel mounts when the magnetic tape is loaded, may be located at a refuge position lower than the reel mounts when the cassette is loaded.

The recording and reproducing means is mounted on the bottom plaste through a mechanical chassis and the mechanical chassis may be inclined upwards at an angle of 30'~20° with respect to the bottom plate, and a capstan motor may be disposed in a space formed between the mechanical chassis and the bottom plate, thanks to the inclination.

In a magnetic tape recording and reproducing plug-in unit according to the present invention, the side plates of the case are each formed therein with the guide slots so that the side plates themselves are used as the guide members, and the slide plates are slidably disposed between the side plates and the cassette holder so as to make the cassette loading mechanism have a triple-layer structure consisting of the side plate, the slide plate and the cassette holder. Further, since the driving means for driving the slide plates is disposed in the space above and backward of the recording and reproducing means, the plug-in unit can be made smaller.

Moreover, by suitably combining the loading of the cassette by oblique movement, the inclined arrangement of the mechanical chassis, and the refuge structure of the guide pins, the plug-in unit can be made still thinner.

BRIEF DESCRIPTION OF THE DRAWINGS

FIGS. 3A to 3C are schematic side views for explaining a cassette loading operation in the first embodiment, in which FIG. 3A shows a state where a cassette is inserted into the unit in the inoperative state, FIG. 3B shows a state where the cassette is inserted into a predetermined inserting position within the unit and FIG. 3C shows a state where the cassette is loaded in a loading position;

FIGS. 8A to 8D are schematic side views for explaining the loading operation of the cassette by inclined movement, in which FIG. 8A shows a state where the cassette is inserted into the unit in the inoperative state, FIG. 8B shows a state where the cassette is inserted into the predetermined position within the unit; FIG. 8C shows a state where the cassette is moved as it is inclined and FIG. 8D shows a state where the cassette is loaded in the loading position;

DESCRIPTION OF THE PREFERRED EMBODIMENTS

Figure 1:
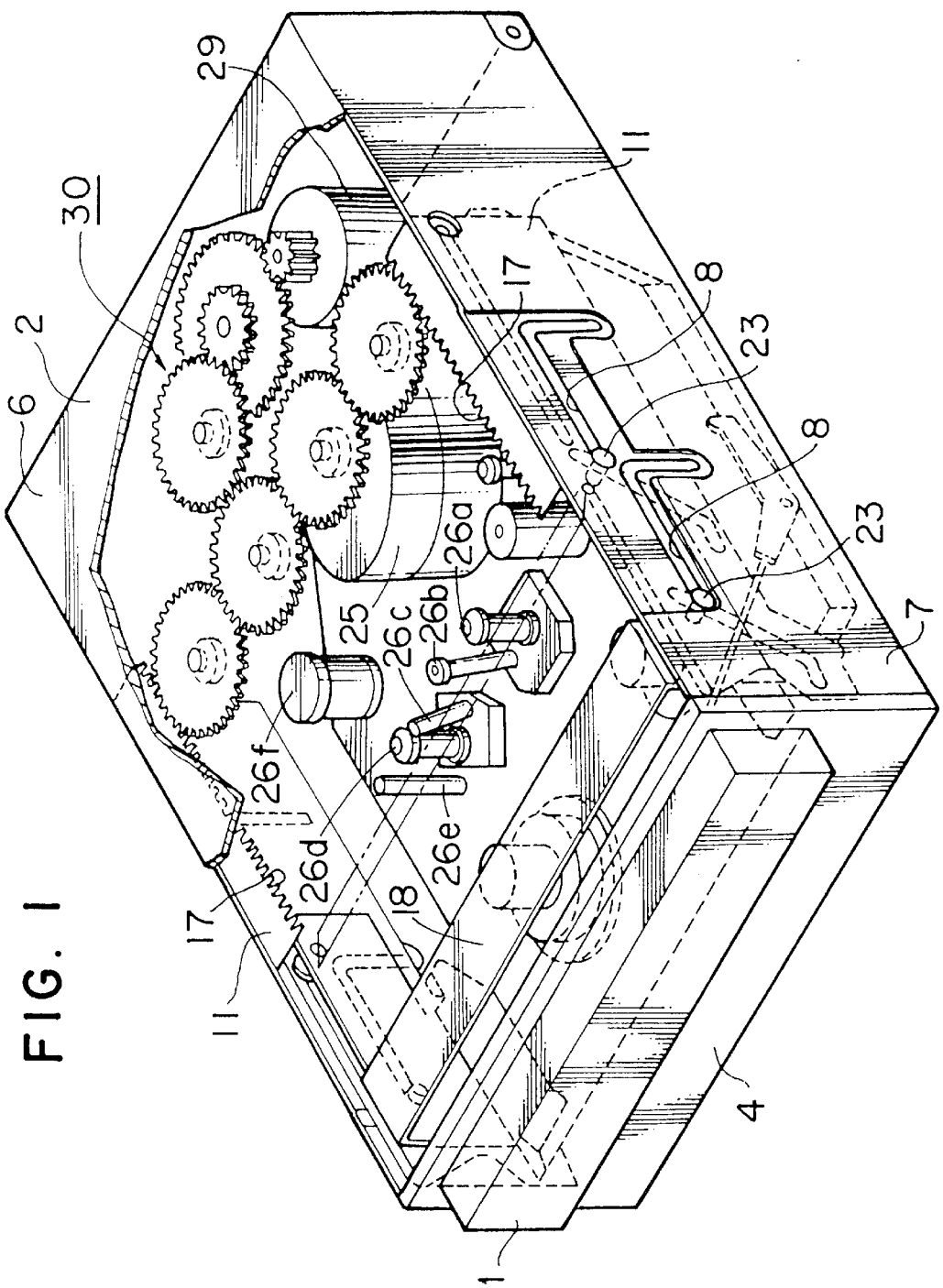
FIG. 1 is a perspective view of a first embodiemnt of a magnetic tape recording and reproducing plug-in unit according to the present invention.
Figure 2:
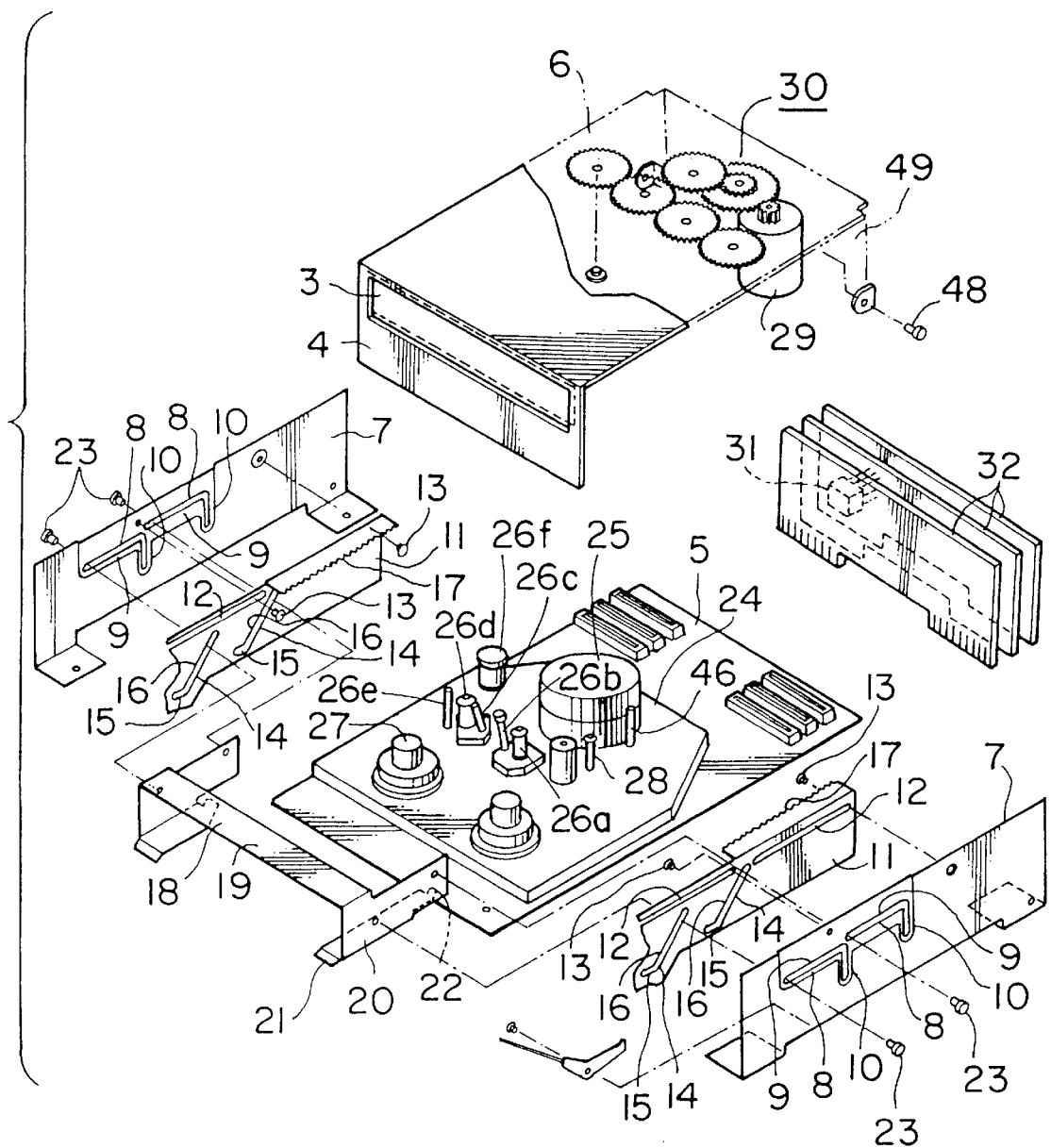
FIG. 2 is a disassembled perspective view of the first embodiment of the plug-in unit shown in FIG. 1.

A magnetic tape cassette 1 to be used in a magnetic tape recording and reproducing plug-in unit of the present invention is such a magnetic tape cassette that a magnetic tape is contained in a cassette of the VTR cassette type, for example a 8-mm cassette for information recording and reproducing. Referring to FIGS. 1–3C, the magnetic tape recording and reproducing plug-in unit of the invention has a case 2. The case 2 comprises a front plate 4 having an insertion opening 3 through which the magnetic tape cassette 1 is inserted, a bottom plate 5, a top plate 6, a pair of side plates 7 and a rear plate 49. The case 2 is 102 mm in width and 42 mm height. Each side plate 7 is formed therein with a pair of guide slots 8 which are arranged in a depthwise direction for guiding the cassette 1 from an inserting position to a loading position. Each of the guide slots 8 comprises a horizontal guide slot portion 9 extending in the depthwise direction of the case 2 and a vertical guide slot portion 10 extending downward from a rear end of the horizontal guide slot portion 9.

A slide plate 11 is disposed along each side plate 7. The slide plate 11 is formed therein with a pair of slits 12 extending in the depthwise direction, and a pair of pins 13 fixed to the side plate 7 pass through the slits 12, respectively. This makes the slide plate 11 slidable in the depthwise direction with respect to the side plate 7. Each slide plate 11 is also formed therein with a pair of cam slots 14 which are arranged in the depthwise direction for moving the cassette 1 from the inserting position to the loading position in cooperation with the guide slots 8. Each of the cam slots 14 comprises a horizontal cam slot portion 15 extending in the depthwise direction of the case 2 and an oblique cam slot portion 16 extending obliquely upwards from a rear end of the horizontal cam slot portion 15. A rear portion of the slide plate 11 is bent toward the inside of the case 2 and formed at an edge thereof with a rack 17.

Inside the pair of slide plates 11 is disposed a cassette holder 18 for holding the magnetic tape cassette 1 inserted into the insertion opening 3. The cassette holder 18 comprises an upper frame 19, side frames 20 and lower frames 21. One of the lower frames 21 is provided at the rear end thereof with a stopper 22 for controlling the insertion of the cassette. A pair of pins 23 are fixed to each of the side frames 20 so as to extend toward the outside of the case. Each pin 23 extends into the guide slot 8 of the side plate 7 passing through the cam slot 14 of the slide plate 11.

A mechanical chassis 24 is mounted on the bottom plate 5 of the case 2, and a recording and reproducing means comprising a rotary magnetic cylinder 25, a plurality of guide pins 26a, 26b, 26c, 26d, 26e and 26f, a pair of reel mounts 27 and a capstan 28, which is well known by those skilled in the art, is mounted on the mechanical chassis 24. In a certain case, the recording and reproducing means may be directly mounted on the bottom plate without using the mechanical chassis.

In a space extending above and backward of the recording and reproducing means within the case 2, a driving means for driving the pair of slide plates 11 in the depthwise direction is provided, which driving means comprises a motor 29 and a gear train 30 connecting drivingly between the motor 29 and the racks 17 of the slide plates 11. The motor 29 is fixed to the top plate 6 of the case 2 by means of a stay which is not shown, and the gear train 30 is also fixed to the top plate 6 above the rotary magnetic cylinder 25.

In the space extending backward of the recording and reproducing means within the case 2 but not interfering with the motor 29, an electronic circuit means is provided which comprises a connection terminal 31 for making electrical connection to a data recorder into which the magnetic tape recording and reproducing plug-in unit is to be inserted, and circuit boards 32.

Figure 3A:
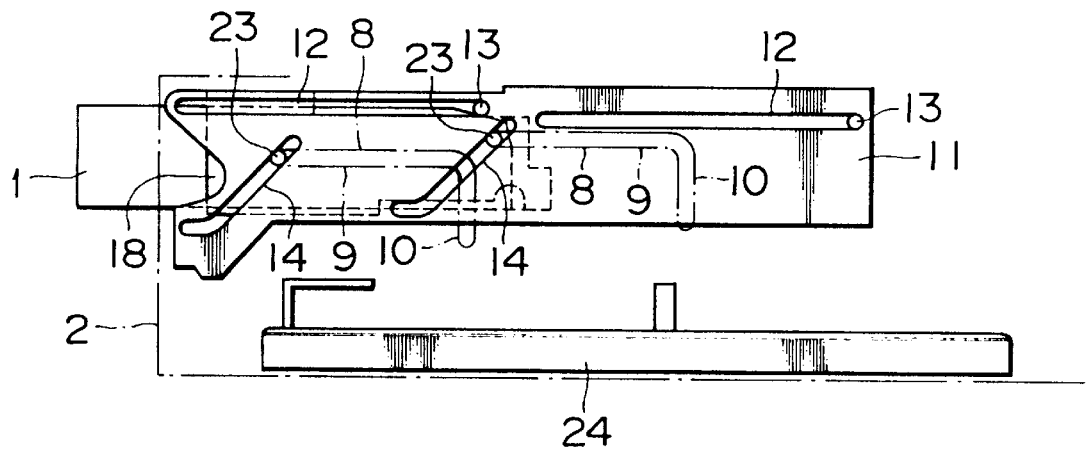
Figure 3B:
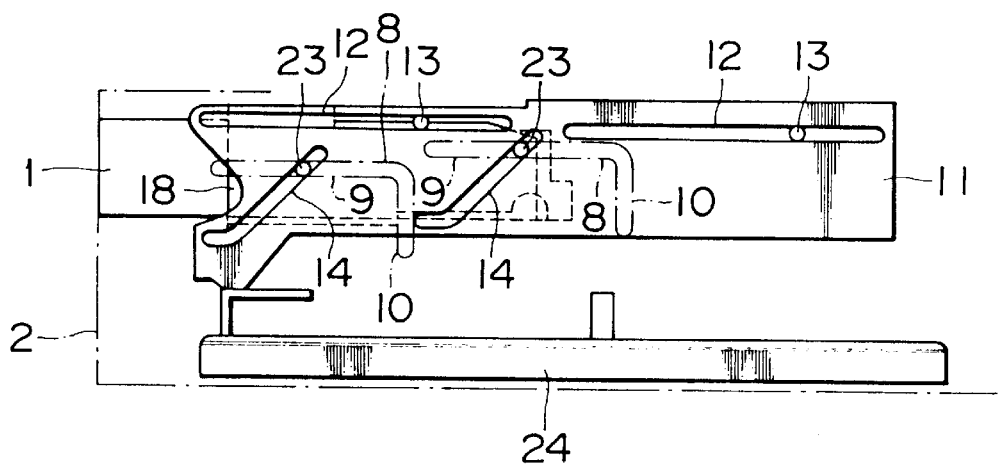
Figure 3C:
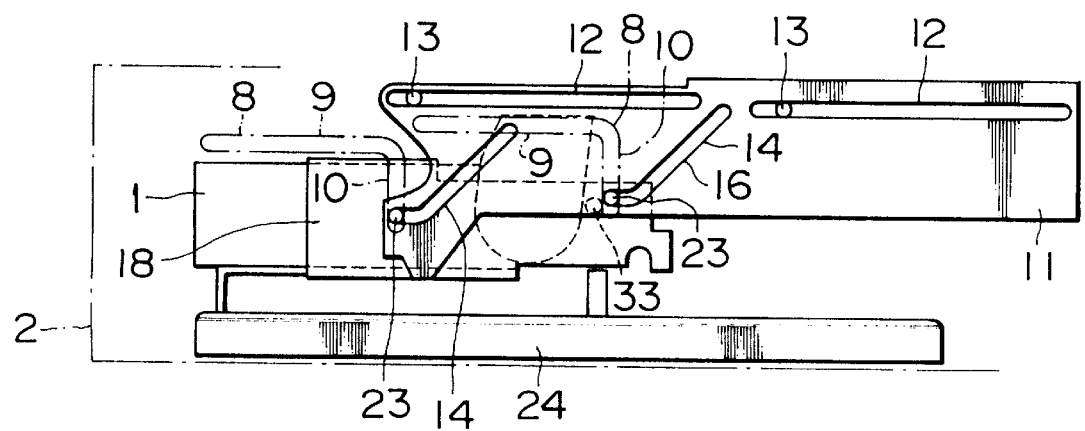

Then, a loading operation of the plug-in unit having the above construction will be described with reference to FIGS. 3A to 3C. As the magnetic tape cassette 1 is inserted into the insertion opening 3, that is, into the cassette holder 18, a forward lower portion of the cassette 1 abuts against the stopper 22 of the cassette holder 18 (FIG. 3A). As the cassette is further pushed in by a predetermined distance, the slide plates 11 are moved backward by a predetermined distance through the cam slots 14 engaged with the pins 23, 23 fixed to the cassette holder 18 (FIG. 3B). At this time, a switch arm (not shown) comes in contact with the slide plate 11 to turn on a cassette insertion detecting switch (not shown) so as to operate the motor 29. A driving force of the motor 29 is transmitted through the gear train 30 to the racks 17 of the slide plates 11 so that the slide plates 11 are moved backward horizontally. By this movement, the pins 23 are moved horizontally along the horizontal guide slot portions 9 of the guide slots 8 in the side plate 7 to engage with the vertical guide slot portions 10, and then pushed downward by the oblique cam slot portions 16 of the slide plates 11 so as to be moved downward along the vertical guide slot portions 10. Namely, the cassette 1 held by the cassette holder 18 is also moved downward. When the cassette is moved downward, a cover of the cassette 1 comes into contact with a cover opening member 33, so that the cover is opened and the cassette is loaded in a predetermined position on the reel mounts 27. Subsequently, the pins 23 engage into the horizontal cam slot portions 15 of the cam slots 14, so that the cassette 1 is prevented from moving downward in excess beyond the predetermined position (FIG. 3C). After the cassette 1 is loaded in the predetermined position, the guide pins 26a, 26b, 26c and 26d are moved to draw out the magnetic tape from the cassette 1 and wind it round the rotary magnetic cylinder 25, thus completing the loading operation of the magnetic tape. An unloading operation of the cassette is performed by reversing the above-described cassette loading operation.

In the described embodiment, the side plates 7 of the case 2 are each formed therein with the guide slots 8 so that the side plates themselves are used as the guide members, and the slide plates 11 are slidably disposed between the side plates 7 and the side frames 20 of the cassette holder 18 so as to make the cassette loading mechanism have a triple-layer structure consisting of the side plate 7, the slide plate 11 and the cassette holder side frame 20. Further, since the driving means for driving the slide plates 11 is provided in the space above and backward of the recording and reproducing means, the plug-in unit can be made smaller such as to be about 101.6 mm in width and about 41.3 mm in height, for example.

Figure 4:
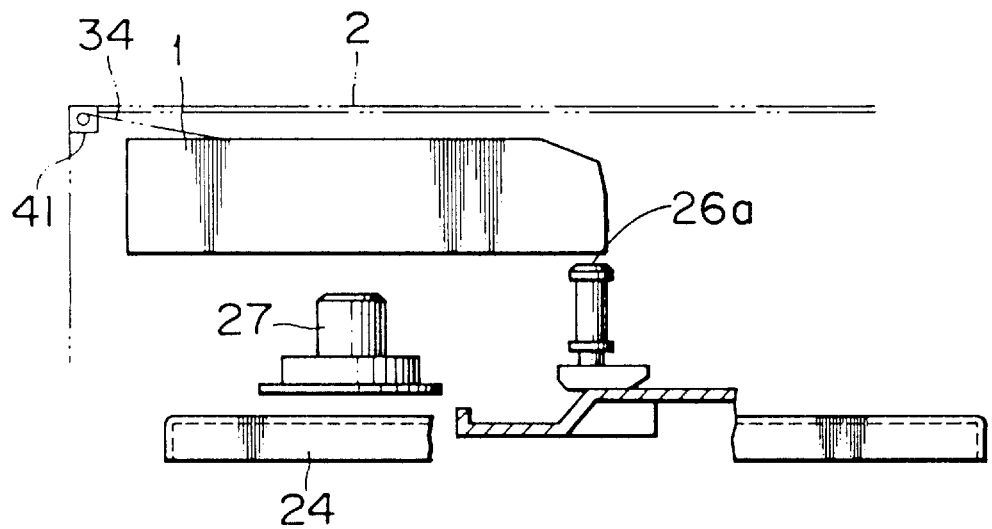
FIG. 4 is a schematic side view showing a relation in height between the cassette, reel mount and guide pin.
Figure 5:
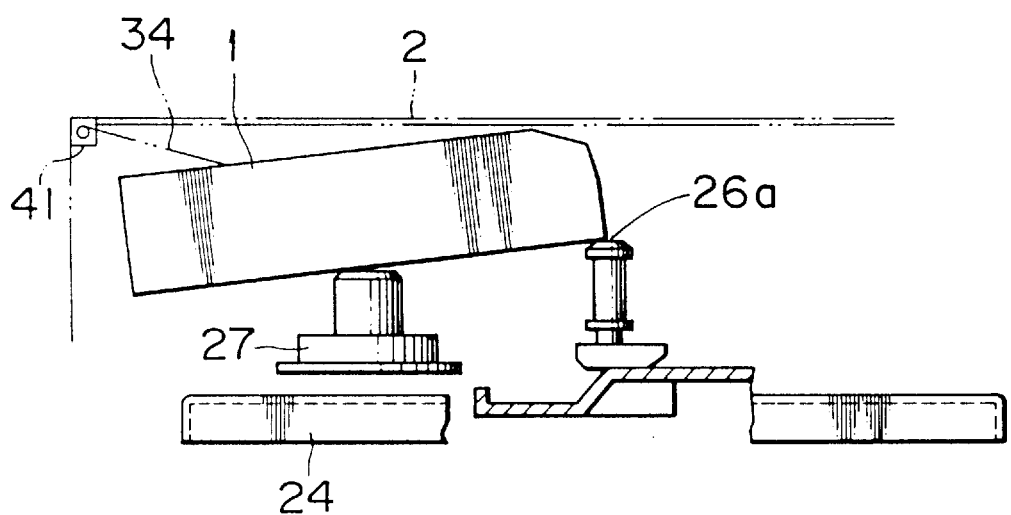
FIG. 5 is a schematic side view showing an idea of loading a cassette by inclined movement according to the invention.

In the described embodiment, the cassette 1 is horizontally inserted between a pivot portion 41 of a door 34 provided at the insertion opening 3 of the case 2 and the highest guide pins 26a and 26d (see FIG. 4), and is moved rearward horizontally and then vertically downwards. There is a space between the cassette 1 and the reel mount 27. Meanwhile, after the cassette 1 has passed through the pivot portion 41 of the door 34, there is also a space between the cassette 1 and the top plate 6 of the case 2. By decreasing these spaces, the case or the plug-in unit can be made still thinner. Namely, as shown in FIG. 5, the cassette 1 is inserted between the pivot portion 41 of the door 34 and the reel mount 27 which is lower than the guide pins 26a and 26d and in order to avoid collision with the guide pins 26a and 26d, the cassette 1 is inclined upwardly before the guide pins 26a and 26d to clear the guide pins 26a and 26d. By doing so, the space between the cassette 1 and the reel mount 27 can be decreased and the space between the top plate 6 of the case 2 and the cassette 1 can be decreased to a size necessary for the cassette 1 to clear the guide pins 26a and 26d, and therefore the height of the case 2 can be reduced.

Figure 6A:
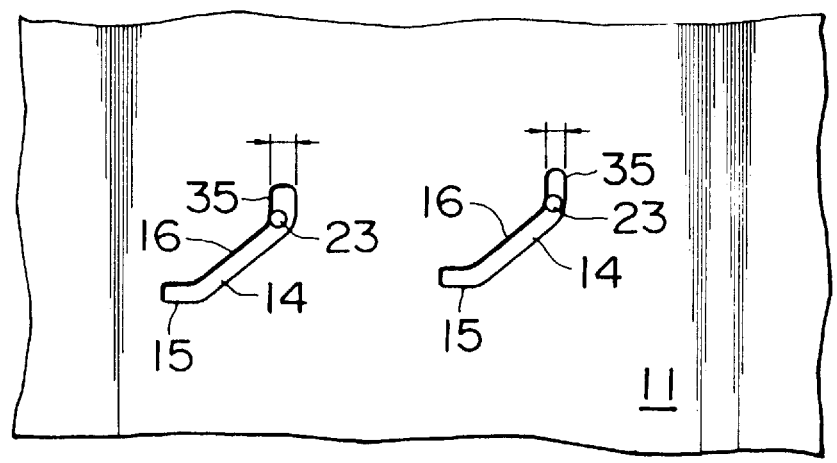
FIGS. 6A and 6B are illustrations showing cam slots formed in a slide plate for performing the loading of the cassette by inclined movement.
Figure 6B:
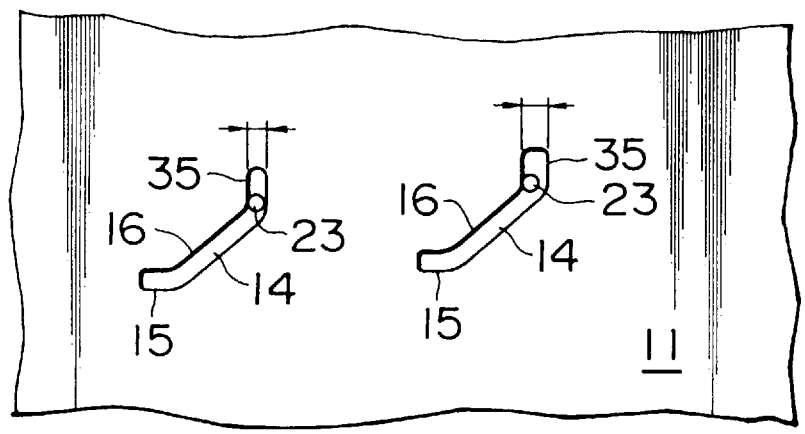
Figure 7A:
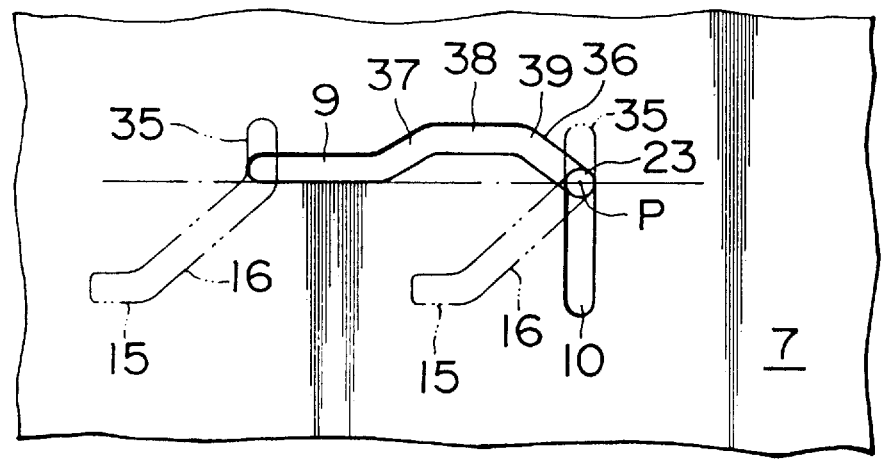
FIGS. 7A and 7B are illustrations showing guide slots formed in a side plate of a case for performing the loading of the cassette by inclined movement.
Figure 7B:
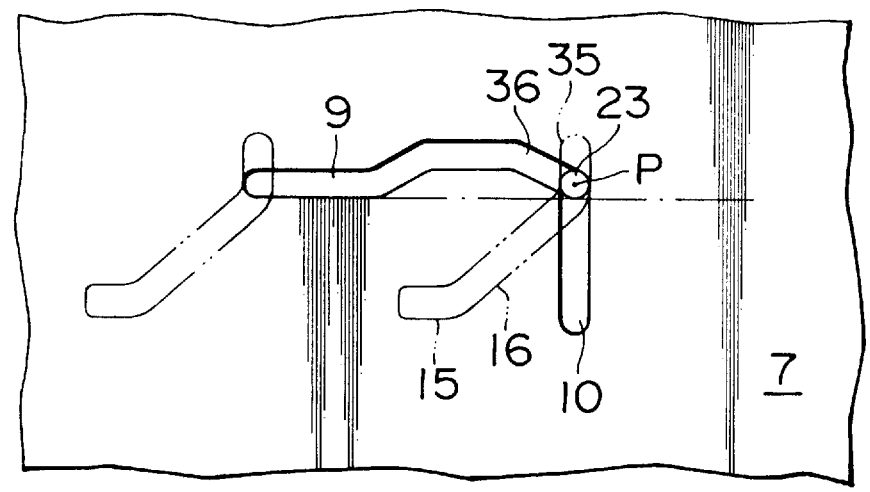
Figure 8A:
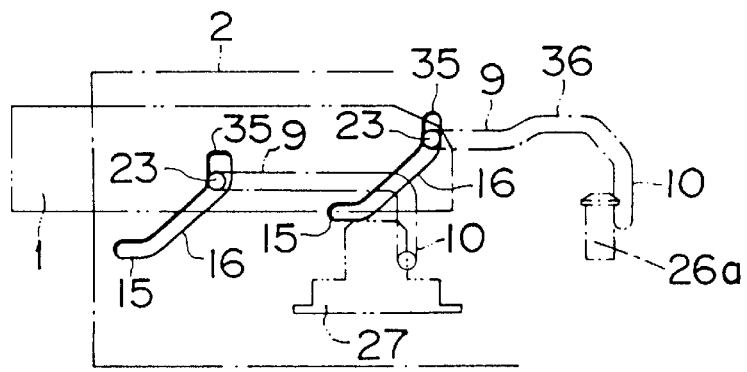
Figure 8B:
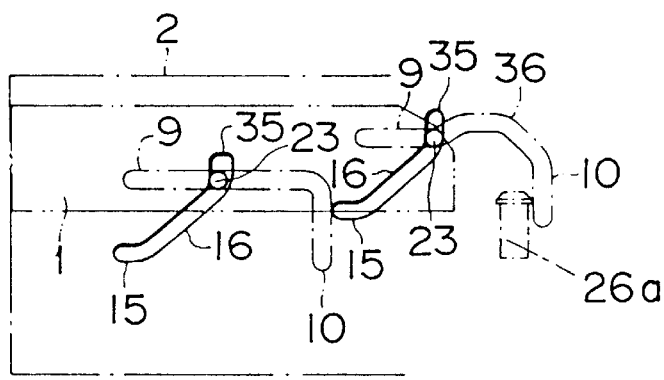
Figure 8C:
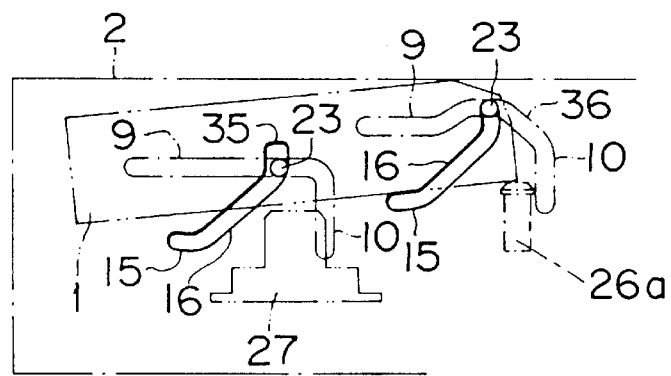
Figure 8D:
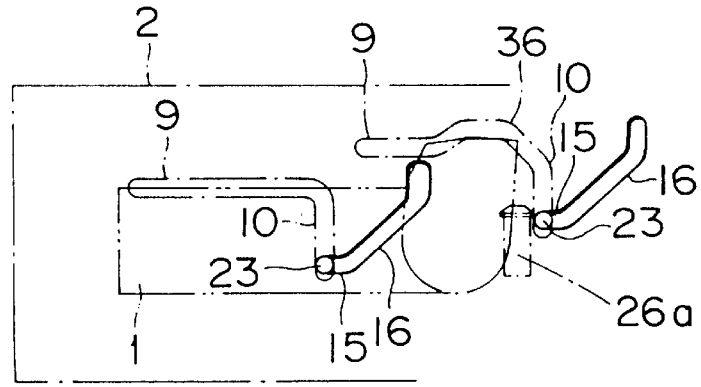

A construction for performing the aforesaid loading of the cassette by oblique movement will be described with reference to FIGS. 6A and 6B, 7A and 7B, and 8A to 8D. Referring to FIGS. 6 and 6B, vertical cam slot portions 35 extending upwardly are connected to upper ends of the oblique cam slot portions 16 of the cam slots 14 formed in the slide plate 11, respectively. One of the vertical cam slot portions 35 of the cam slots 14 arranged in the depthwise direction is designed to have a width larger than the other vertical cam slot portion. This makes it possible to incline the cassette 1. On the other hand, the rear guide slot 8, one of the guide slots formed in the side plate 7, is formed in the horizontal guide slot portion 9 thereof with a convex guide slot portion 36 which is convex upwardly and connected to the vertical guide slot portion 10 (FIGS. 7A and 7B). The convex guide slot portion 36 comprises an upward tilt portion 37 tilting upwardly, a horizontal portion 38 connecting with the upward tilt portion 37 and a downward tilt portion 39 connecting with both the horizontal portion 38 and the vertical guide slot portion 10 and tilting downwards. It is important that a connecting point P between the convex guide slot portion 36 and the vertical guide slot portion 10 is located below the level of a lower surface of the horizontal guide slot portion 9 (FIG. 7A). This is for the purpose of preventing an accident that, if the connecting point P is located above the level of the lower surface of the horizontal guide slot portion 9 as shown in FIG. 7B, the pin 23 gets in between the vertical surface of the vertical cam slot portion 35 and the vertical surface of the vertical guide slot portion 10 at the time of loading so as not to be able to move.

Referring to FIGS. 8A to 8D, operation will be described. As the cassette 1 is inserted into the cassette holder 18 (FIG. 8A) and pushed into a predetermined position (FIG. 8B), the slide plate 11 is moved rearward horizontally by the driving force of the motor 29. Accordingly, the pins 23 arranged in the depthwise direction are moved horizontally along the horizontal guide slot portions 9 by the vertical cam slot portions 35 of the slide plate 11. Subsequently, only the forward pin 23 is moved upwardly along the upward tilt portion 37 of the convex guide slot portion 36, so that the cassette 1 is inclined upwardly. The forward pin 23 is moved along the horizontal portion 38 of the convex guide slot portion 36 (FIG. 8C), and therefore the cassette 1 clears the guide pins 26a and 26d. The forward pin 23 is moved along the downward tilt portion 39 of the convex guide slot portion 36, and therefore the cassette 1 is returned to the horizontal state. Thereafter, the pins 23 arranged in the depthwise direction are pushed into the vertical guide slot portions 10 by the oblique cam slot portions 16, moved downward along the vertical guide slot portions 10 (FIG. 8D), and received in the horizontal cam slot portions 15. In consequence, the cassette 1 is loaded in the predetermined position.

Figure 9:
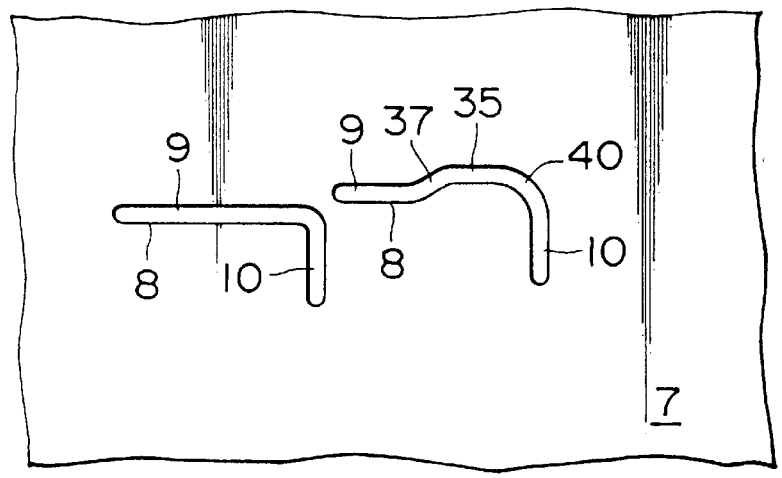
FIG. 9 is an illustration showing a modification of the guide slots formed in the side plate of the case for performing the loading of the cassette by inclined movement.

The downward tilt portion 39 of the convex guide slot portion 36 may be a smooth arcuate slot 40 as shown in FIG. 9.

Figure 10:
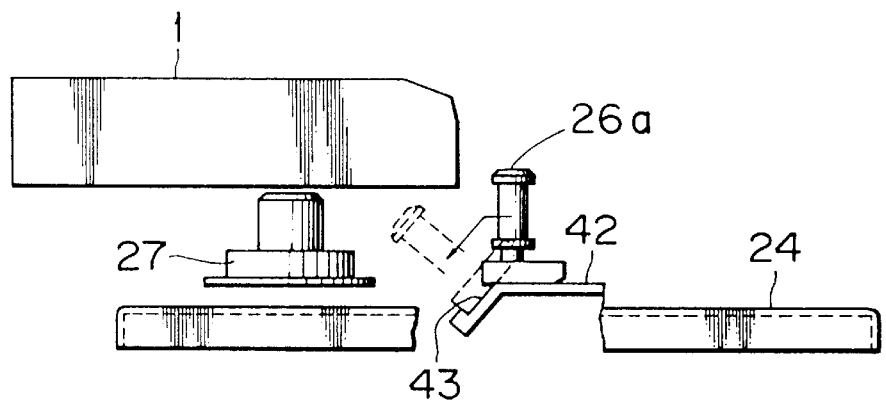
FIG. 10 is a schematic side view showing a refuge structure of the guide pin.
Figure 11:
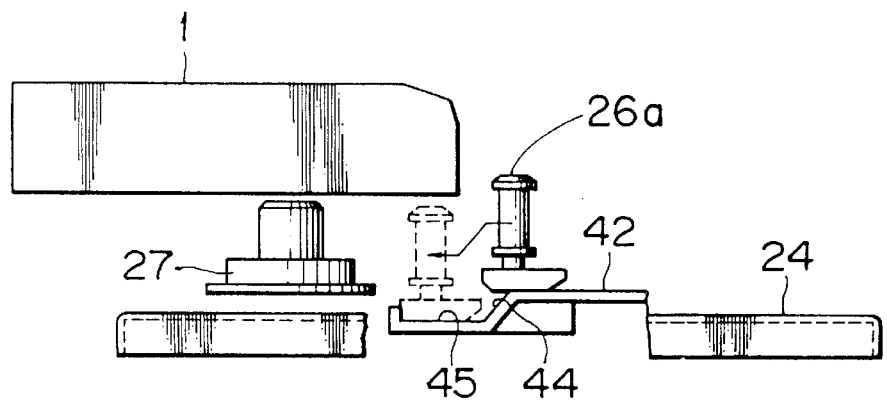
FIG. 11 is a schematic side view showing another refuge structure of the guide pin.

As described above, in the embodiment described above, the cassette 1 is inserted horizontally between the pivot portion 41 of the door 34 provided at the insertion opening 3 of the case 2 and the highest guide pins 26a and 26d, and there is the space between the cassette 1 and the reel mount 27. A construction by which this space is decreased to reduce the height of the case 2 will be described with reference to FIGS. 10 and 11. One guide pin 26a, which is higher than the reel mount 27, is slidably mounted on a guide surface 42. In FIG. 10, the guide surface 42 has an inclined plane 43, and the guide pin 26 is inclined to a refuge position shown by broken lines at the time of cassette loading. In FIG. 11, the guide surface 42 has an inclined plane 44 and a horizontal plane 45 connecting therewith, and the guide pin 26a is moved horizontally to a refuge position shown by broken lines at the time of cassette loading. At the refuge position, the guide pin 26a is made lower than the reel mount 27. When loading the magnetic tape, the guide pin 26a is caused to slide on the guide surface 42 by a guide pin moving apparatus, which is well known by those skilled in the art, so as to recover its working height.

The guide pins 26a, 26b, 26c and 26d are pins for pulling out the tape from the cassette 1 and may be moved to a refuge position when the cassette 1 is loaded. The guide pins 26e and 26f are fixed to the mechanical chassis 24 and do not need to be moved to a refuge position.

With this construction, the cassette 1 is horizontally moved slightly above the reel mount 27 without colliding against the guide pin 26a, and loaded in the predetermined position in the same manner as shown in FIGS. 3A to 3C. Thereafter, the guide pin 26a is moved along the guide surface 42 to the working position, and then the magnetic tape is loaded in the predetermined position.

Figure 12:
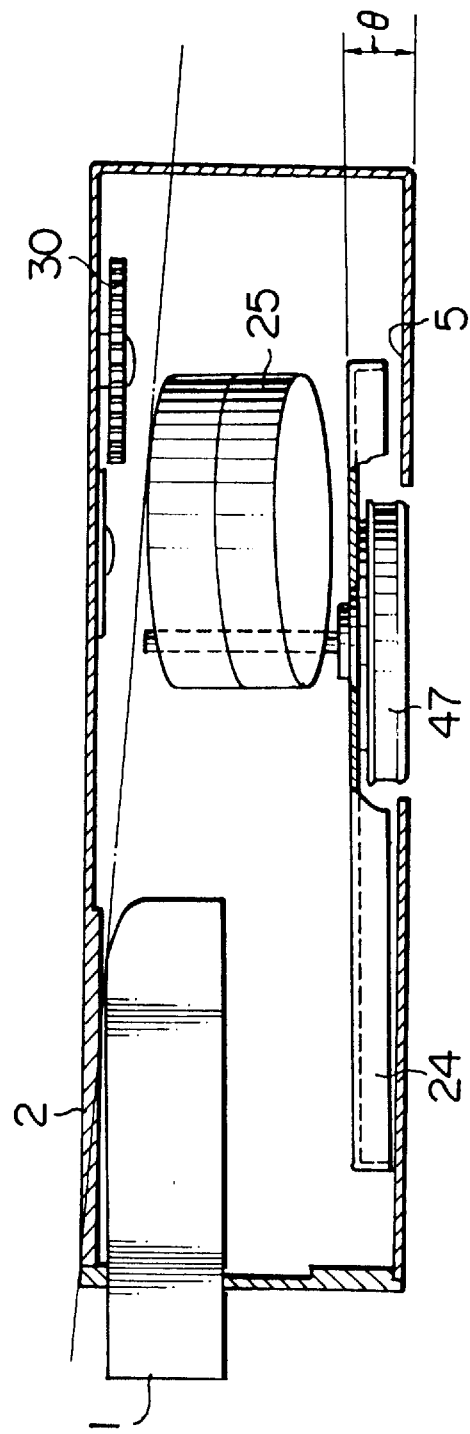
FIG. 12 is a partly-omitted schematic side sectional view showing an inclined arrangement of a mechanical chassis.

FIG. 12 shows another construction for reducing the height of the case 2. The mechanical chassis 24 is so mounted as to be inclined upward at an angle θ with respect to the bottom plate 5 of the case 2. In a space formed between the mechanical chassis 24 and the bottom plate 5 of the case 2 owing to this inclination, a capstan motor 47 is disposed. This contributes to reduction of the height of the case 2. If the angle of inclination of the mechanical chassis 24 is too large, the cassette 1 must be inserted obliquely with respect to the front plate 4 of the case 2, which makes the user feel a sense of incongruity. However, it is confirmed that there is no practical problem so far as the angle of inclination is in a range of 30'~2°.

Figure 13:
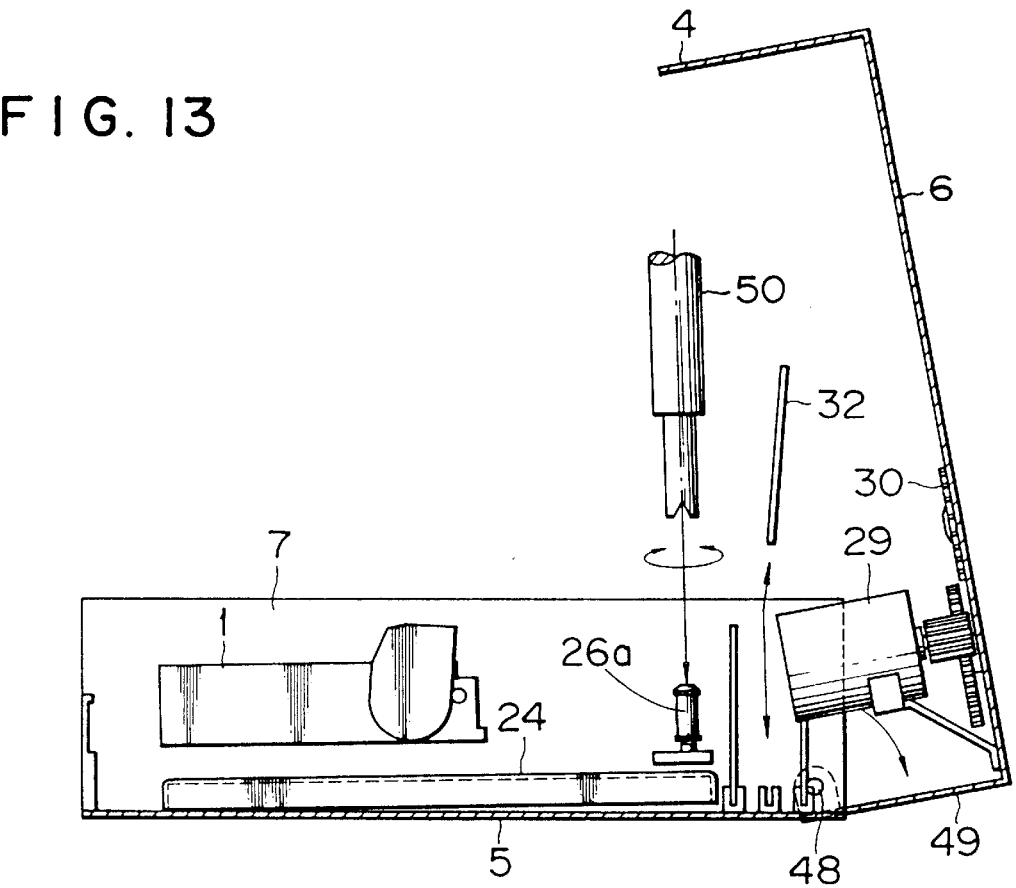
FIG. 13 is a schematic side sectional view showing a structure of rotatably attaching a top plate of the case.

As shown in FIG. 13, in the embodiment described above, the front plate 4, the top plate 6 and the rear plate 49 of the case 2 are constructed as one body, and the rear plate 49 is attached to the side plates 7 by means of pins 48 so that this body can rotate upwardly. With this construction, even in the state where the magnetic tape has been loaded, an adjusting jig 50 is enabled to enter into the plug-in unit to adjust the height of the guide pins 26a and 26d. Further, adjustment and replacement of the circuit board 32 can be performed easily.

Figure 14:
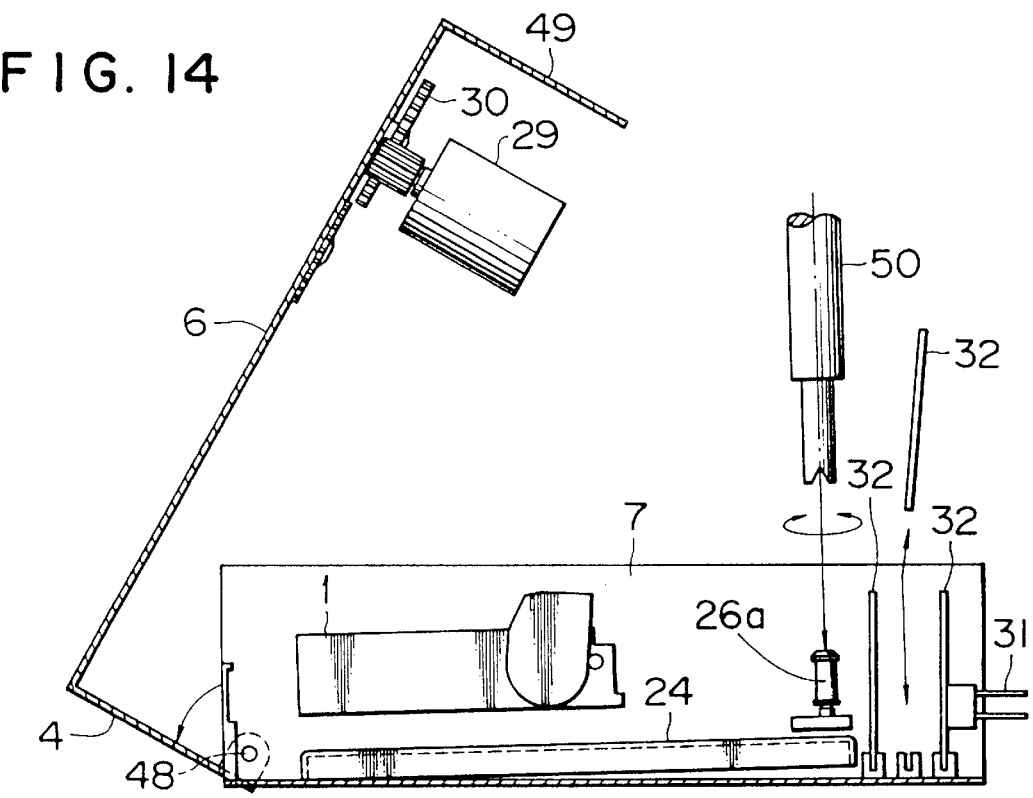
FIG. 14 is a schematic side sectional view showing another structure of rotatably attaching the top plate of the case.
Figure 15:
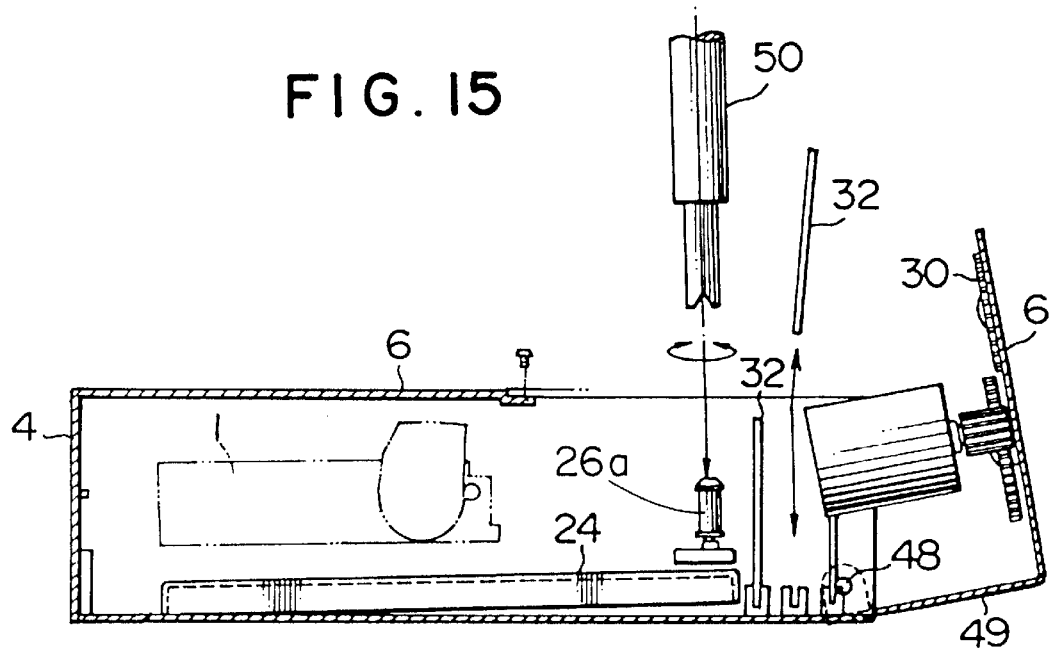
FIG. 15 is a schematic side sectional view showing still another structure of rotatably attaching the top plate of the case.
Figure 16:
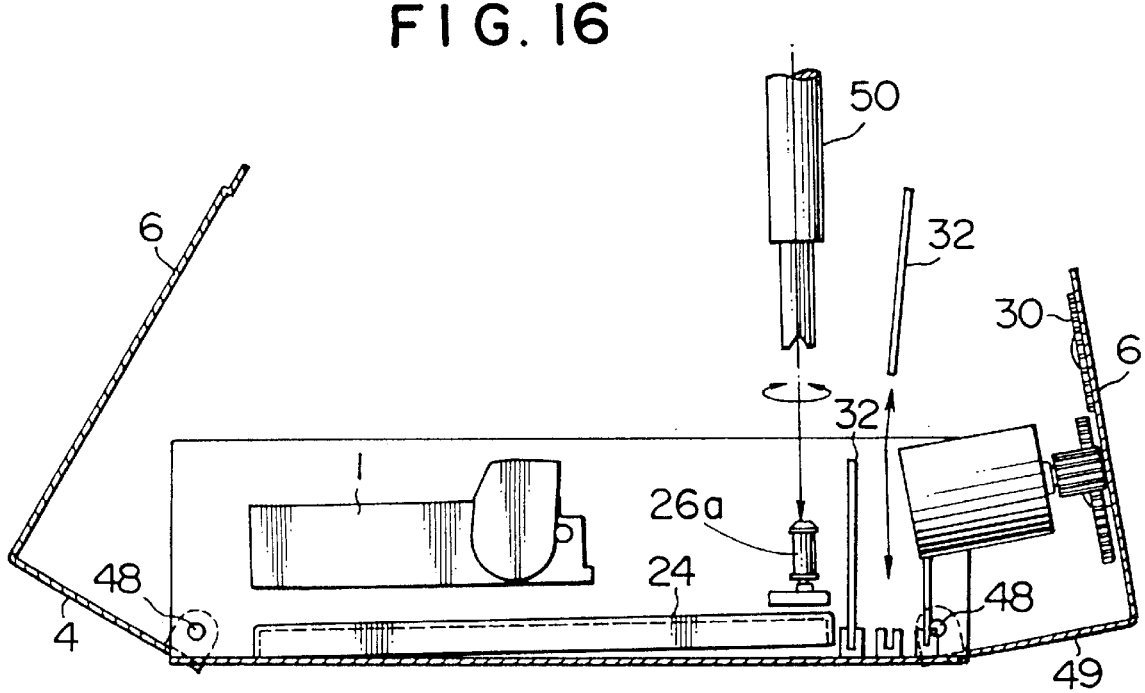
FIG. 16 is a schematic side sectional view showing still another structure of rotatably attaching the top plate of the case.

FIG. 14 shows a modification of the construction shown in FIG. 13, in which the front plate 4, the top plate 6 and the rear plate 49 are constructed as one body, and the front plate 4 is attached to the side plates 7 with the pins 48 for free upward rotation of this body. FIG. 15 also shows another modification of the construction shown in FIG. 13, in which the top plate 6 is divided into two or front and rear portions, the top plate rear portion and the rear plate 49 are constructed as one body, and the rear plate 49 is attached to the side plates 7 with the pins 48 for free upward rotation. FIG. 16 also shows still another modification of the construction shown in FIG. 13, in which the top plate 6 is divided into two or front and rear portions, the top plate front portion and the front plate 4 are constructed as one body and the front plate 4 is attached to the side plates 7 with the pins 48 for free upward rotation, while the top plate rear portion and the rear plate 49 are constructed as one body and the rear plate 49 is attached to the side plates 7 with the pins 48 for free upward rotation. In these modifications as well, the adjustment of the height of the guide pins 26a and 26d and the adjustment and replacement of the circuit board 32 can be performed easily.

Figure 17:
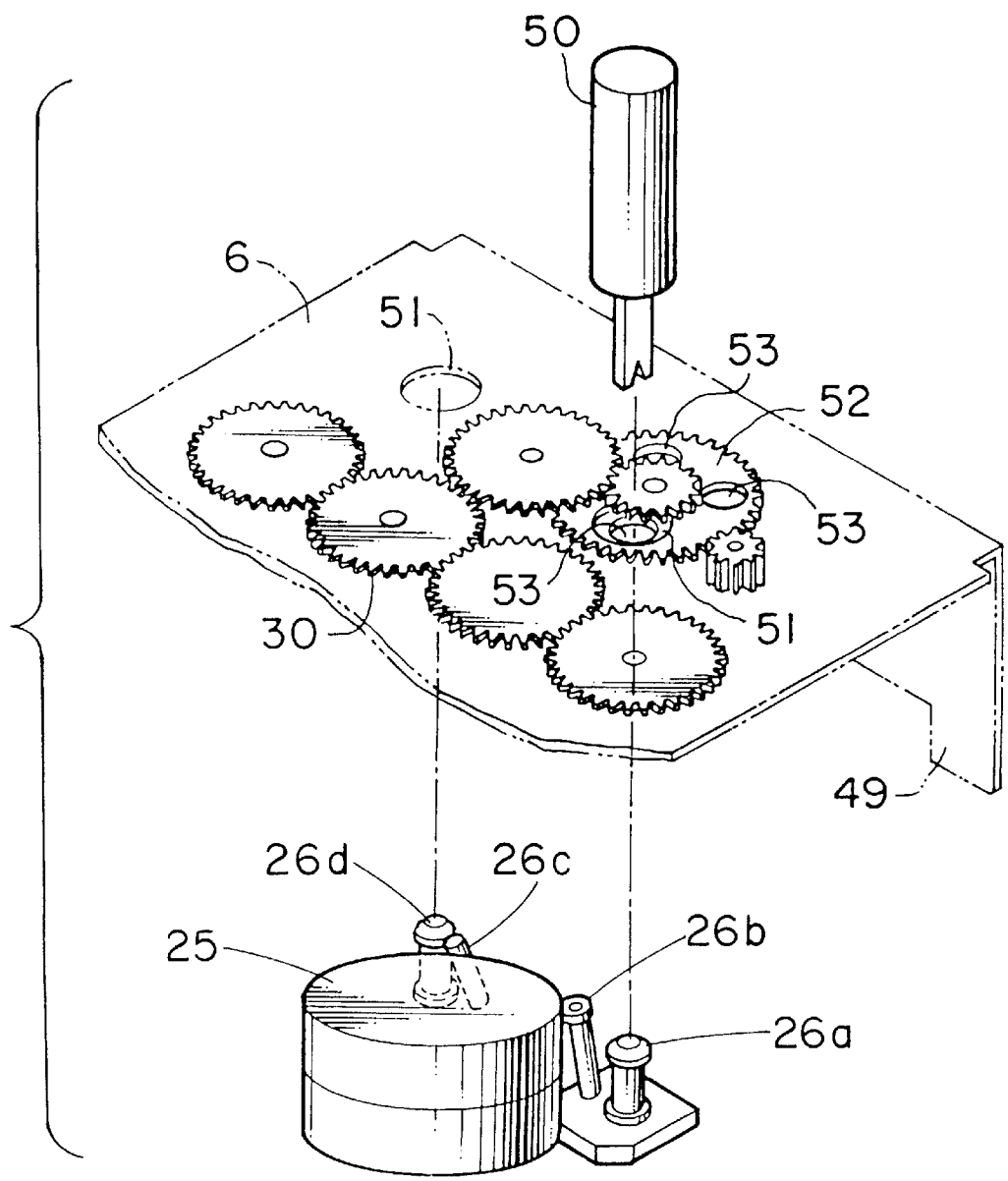
FIG. 17 is a schematic perspective view of a guide pin adjusting structure.

The adjustment of the height of the guide pins 26a and 26d can also be performed even with the construction shown in FIG. 17. Although the top plate 6 and the rear plate 49 are fixed, through holes 51, 53 are formed in the top plate 6 and the gear 52 at those portions thereof corresponding to the guide pins 26a and 26d. By inserting the adjusting tool 50 into the case 2 through these through holes 51, 53, the adjustment of the height of the pins 26a and 26d can be performed.

Figure 18:
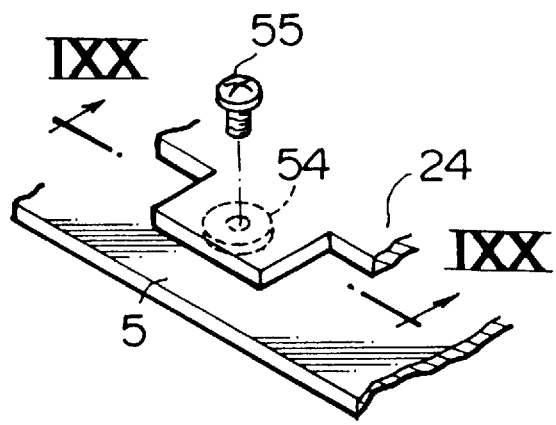
FIG. 18 is a schematic perspective view of an antivibration structure between a bottom plate of the case and the mechanical chassis.
Figure 19:
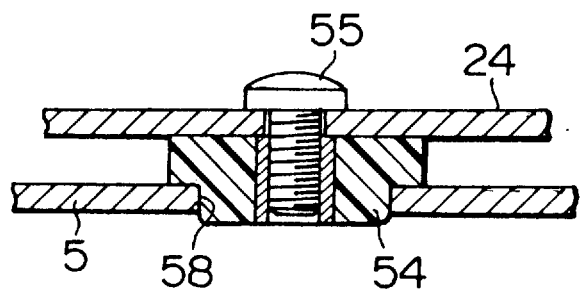
FIG. 19 is a sectional view taken along the line IXX—IXX of FIG. 18.
Figure 20:
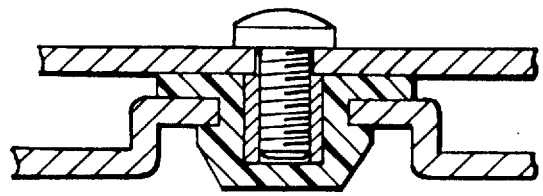
FIG. 20 is a sectional view similar to FIG. 19 but showing another antivibration structure.

Next, an antivibration structure of the magnetic tape recording and reproducing plug-in unit of the present invention will be described with reference to FIGS. 18–24. Referring to FIGS. 18, 19, the bottom plate 5 of the case 2 is formed therein with a hole 58, and an antivibration member 54 made of rubber or the like is fitted in the hole 58. The antivibration member 54 is formed with an internal thread. The mechanical chassis 24 is mounted on the antivibration member 54 by means of a screw 55 screwed into the internal thread of the antivibration member 54. FIG. 20 shows another antivibration member 56 which is a modification of the antivibration member 54. The antivibration member 56 is formed with a stopper 57 so that the antivibration member is prevented from falling off.

Figure 21:
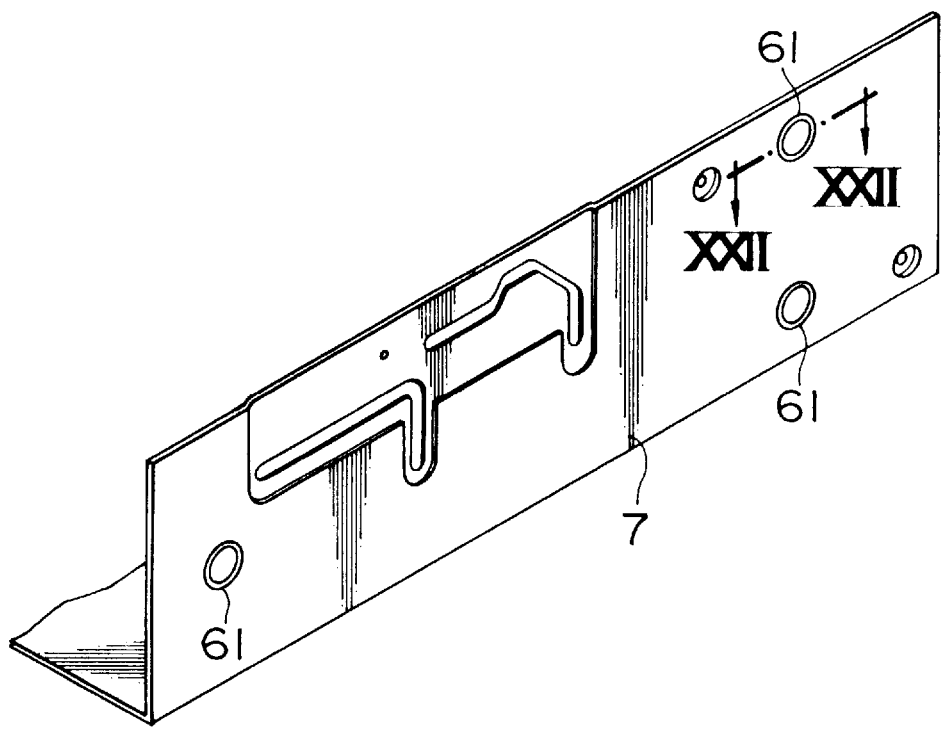
FIG. 21 is a perspective view of a portion of the case.
Figure 22:
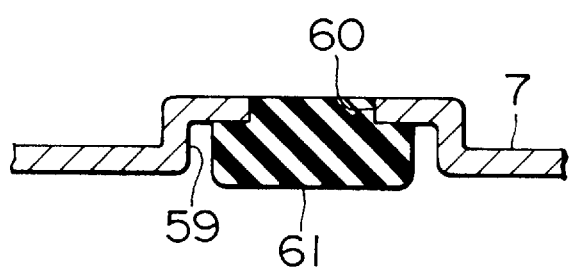
FIG. 22 is a sectional view taken along the line XXII—XXII of FIG. 21.

Referring to FIGS. 21 and 22, the side plate of the case 2 is formed with recesses 59 each of which is formed at the bottom thereof with a hole 60. An antivibration member 61 made of rubber or the like is fitted in the hole 60. The outer surface of the antivibration member 61 is made to stand out from the outer surface of the side plate 7. With this construction, an antivibration effect is attained against the vibration applied from sides to the plug-in unit.

Figure 23:
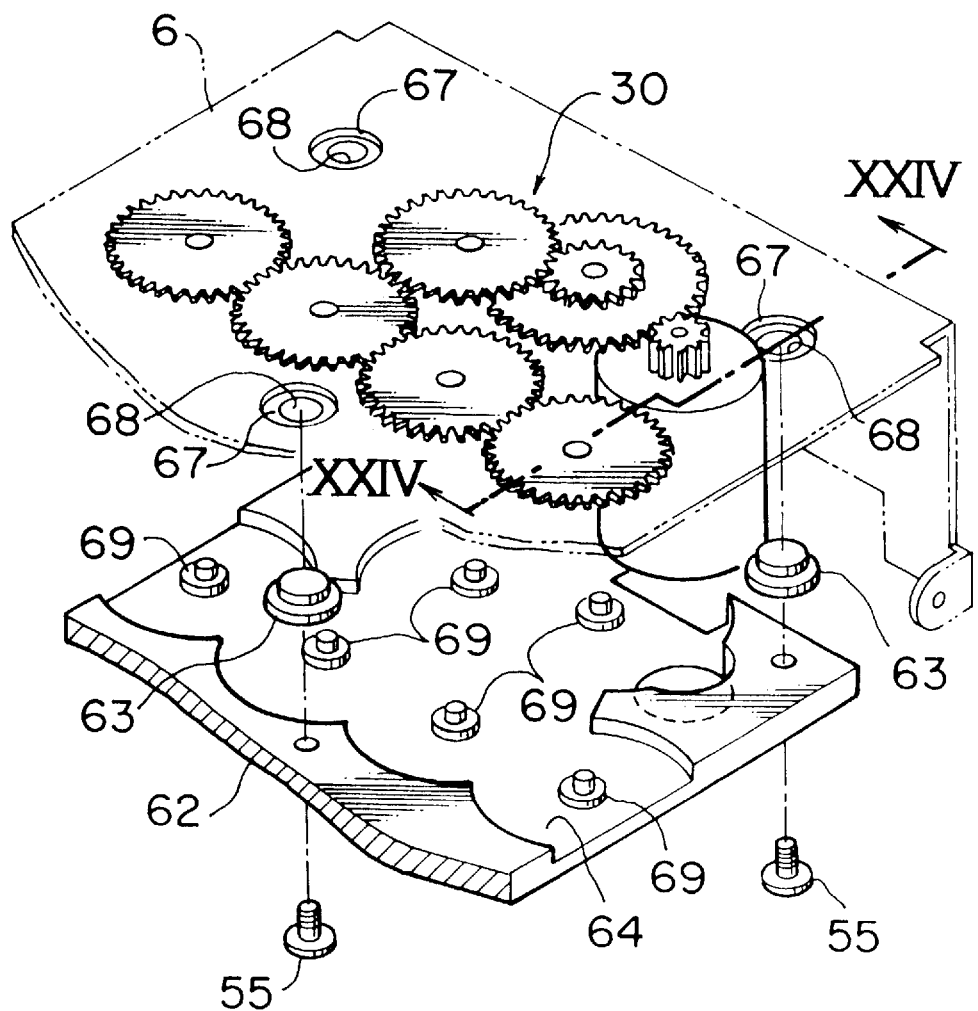
FIG. 23 is a disassembled perspective view showing an antivibration structure of a gear train attached to the top plate of the case.
Figure 24:
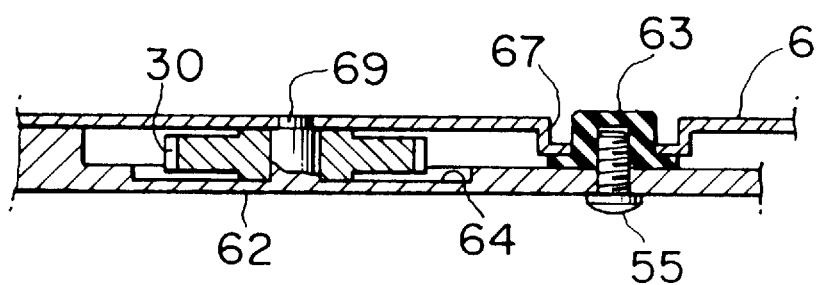
FIG. 24 is a sectional view taken along the line XXIV—XXIV of FIG. 23.

Referring to FIGS. 23 and 24, the top plate 6 is formed with recesses 67 each of which is formed at the bottom thereof with a hole 68. An antivibration member 63 having an internal thread formed therein is fitted in the hole 68. A fixed plate 62 is provided below the top plate 6 and is attached to the antivibration members 63 with screws 55 screwed into the internal threads of the antivibration members 63. The fixed plate 62 is formed with a receiving portion 64 for receiving the gear train 30, and pins 69 corresponding to the respective gears of the gear train 30 are provided at predetermined positions in the receiving portion 64. The gear train 30 is rotatably fitted on the pins 69. The antivibration members 63 prevent the vibration from the top plate 6 from being transmitted to the gear train 30. Further, since the gear train 30 is enveloped by the top plate 6 and the fixed plate 62, noise of the gear train is prevented from being transmitted to the outside.

Figure 25:
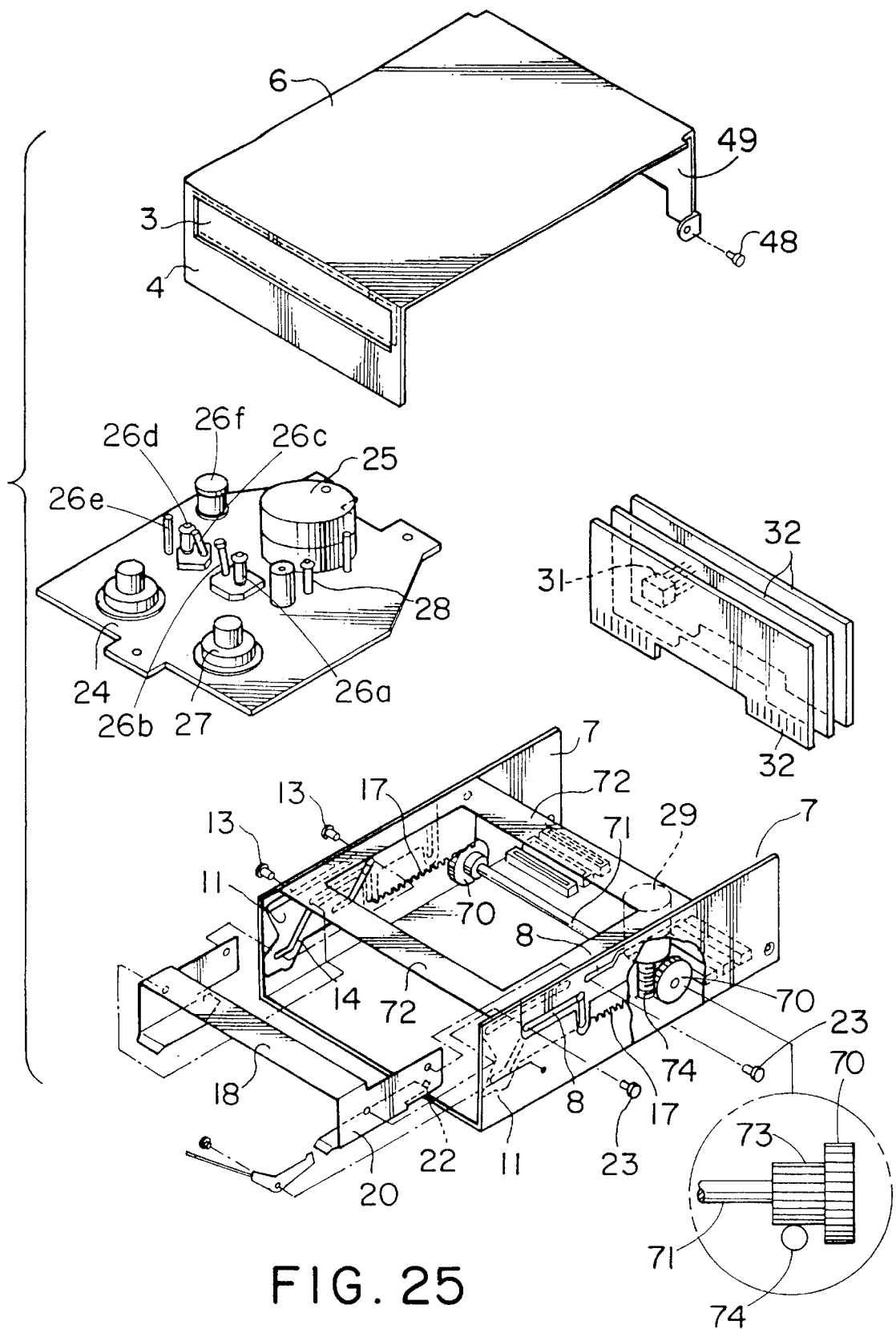
FIG. 25 is a disassembled perspective view of a second embodiment of a magnetic tape recording and reproducing plug-in unit according to the present invention, which is to be used by insertion into an opening of a data recorder.

FIG. 25 shows a magnetic tape recording and reproducing plug-in unit according to a second embodiment of the present invention. In the second embodiment, the left and right slide plates 11 are connected to each other by a connecting plate 72, and the racks 17 are formed at the rear lower end portions of the respective slide plates 11. The racks 17 mesh with gears 70 fixed on a shaft 71, respectively. One of the gears 80 is formed integrally with a worm wheel 73. The worm wheel 73 meshes with a worm 74 fixed to a driving shaft of the motor 29. The motor 29 is mounted on the bottom plate 5 of the case 2 by means of a stay which is not shown. The second embodiment has the effect of enhancing the rigidity of the slide plates 11 and smoothing the movement of the slide plates 11, as compared with the first embodiment.

What is claimed is:

1. A magnetic tape recording and reproducing plug-in unit, said plug-in unit comprising:

a box-like case comprising a front panel, a pair of side panels, a top panel and a rear panel, said front panel having an insertion opening through which a magnetic tape carried on a cassette is inserted, and said pair of side panels each formed with a pair of guide slots arranged in a depthwise direction for guiding the cassette from an inserting position to a loading position;

a pair of slide plates attached to said pair of side panels so as to be slidable in the depthwise direction within said case, each of said slide plates being formed with a pair of cam slots arranged in the depthwise direction for moving the cassette from the inserting position to the loading position in cooperation with said guide slots, each of said slide plates further having a rack provided at an edge of the slide plate;

a cassette holder disposed inside said pair of slide plates for holding the cassette inserted into said insertion opening, and having pins extending through said cam slots of said slide plates into said guide slots of said side panels;

a mechanical chassis provided on a lower portion of said case;

a recording and reproducing means comprising a rotary magnetic cylinder, a plurality of guide pins and a pair of reel mounts, and mounted on said mechanical chassis;

a driving means comprising a motor and a gear train, the gear train connecting said motor and said racks of said slide plates, the driving means being disposed at the rear of said recording and reproducing means for driving said pair of slide plates in the depthwise direction; and, an electronic circuit means comprising a connection terminal to a data recorder, and disposed at the rear of said recording and reproducing means;

wherein each of said pair of guide slots formed in said side panels of said case has a horizontal guide slot portion extending in the depthwise direction of said case and a vertical guide slot portion extending downward from a rear end of said horizontal guide slot portion;

wherein each of said cam slots has a horizontal cam slot portion extending in the depthwise direction of said case and an oblique cam slot portion extending obliquely upwards from a rear end of said horizontal cam slot portion;

wherein each pair of guide slots includes a rear guide slot having a convex guide slot portion formed in the horizontal guide slot portion, the convex guide slot portion being convex in an upward direction and connected to the vertical guide slot portion at a point located below a level of a lower surface of the horizontal slot portion;

wherein each cam slot has a vertical cam slot portion extending in an upward direction from an end of the oblique cam slot portion, a width of the vertical cam slot portion of a first cam slot in the pair being different from a width of the vertical cam slot portion of a second cam slot in the pair;

wherein at least one of said guide pins moves horizontally and vertically along a guide surface connected to the mechanical chassis, a top of the guide pin being higher than a top of said reel mounts when the guide pin is at a first position on the guide surface, and the top of the guide pin being lower than the top of the reel mounts when the guide pin is at a second position on the guide surface, the second position being a refuge position for the guide pin; and, wherein the guide pin is at the first position on the guide surface when the magnetic tape is loaded onto the rotary magnetic cylinder and the guide pin is at the refuge position when the cassette is loaded onto said cassette holder.

2. The magnetic tape recording and reproducing plug-in unit according to claim 1, wherein said case has a bottom panel;

wherein said recording and reproducing means is mounted on said bottom panel through said mechanical chassis and said mechanical chassis is inclined upwards at an angle of $30'\sim 2°$ with respect to said bottom panel; and, wherein a capstan motor is disposed in a space formed between said mechanical chassis and said bottom panel, the space being formed by the angle between the mechanical chassis and the bottom panel.

3. The magnetic tape recording and reproducing plug-in unit according to claim 1, wherein said case is about 102 mm in width and about 42 mm in height.

4. The magnetic tape recording and reproducing plug-in unit according to claim 3, wherein said case has a bottom panel;

wherein said recording and reproducing means is mounted on said bottom panel through said mechanical chassis and said mechanical chassis is inclined upwards at an angle of $30'\sim 2°$ with respect to said bottom panel; and, wherein a capstan motor is disposed in a space formed between said mechanical chassis and said bottom panel, the space being formed by the angle between the mechanical chassis and the bottom panel.

5. The magnetic tape recording and reproducing plug-in unit according to claim 1, wherein said top panel and said rear panel of said case are constructed as one body and attached to said side panels for free upward rotation.

6. The magnetic tape recording and reproducing plug-in unit according to claim 1, wherein said top panel of said case comprises a front portion and a rear portion, said rear portion and said rear panel being constructed as one body and attached to said side panels for free upward rotation.

7. The magnetic tape recording and reproducing plug-in unit according to claim 6, wherein said front portion and said front panel are constructed as one body and attached to said side panels for free upward rotation.

8. The magnetic tape recording and reproducing plug-in unit according to claim 1, wherein an antivibration member is interposed between said mechanical chassis and a bottom panel of the case.

9. A magnetic tape recording and reproducing plug-in unit, said plug-in unit comprising:

a box-like case comprising a front panel, a pair of side panels, a top panel and a rear panel, said front panel having an insertion opening through which a magnetic tape carried on a cassette is inserted, and said pair of side panels each formed with a pair of guide slots arranged in a depthwise direction for guiding the cassette from an inserting position to a loading position;

a pair of slide plates attached to said pair of side panels so as to be slidable in the depthwise direction within said case, each of said slide plates being formed with a pair of cam slots arranged in the depthwise direction for moving the cassette from the inserting position to the loading position in cooperation with said guide slots, each of said slide plates further having a rack provided at an edge of the slide plate;

a cassette holder disposed inside said pair of slide plates for holding the cassette inserted into said insertion opening, and having pins extending through said cam slots of said slide plates into said guide slots of said side panels;

a mechanical chassis provided on a lower portion of said case;

a recording and reproducing means comprising a rotary magnetic cylinder, a plurality of guide pins and a pair of reel mounts, and mounted on said mechanical chassis;

a driving means comprising a motor and a gear train, the gear train connecting said motor and said racks of said slide plates, the driving means being disposed at the rear of said recording and reproducing means for driving said pair of slide plates in the depthwise direction; and, an electronic circuit means comprising a connection terminal to a data recorder, and disposed at the rear of said recording and reproducing means;

wherein each of said pair of guide slots formed in said side panels of said case has a horizontal guide slot portion extending in the depthwise direction of said case and a vertical guide slot portion extending downward from a rear end of said horizontal guide slot portion;

wherein each of said cam slots has a horizontal cam slot portion extending in the depthwise direction of said case and an oblique cam slot portion extending obliquely upwards from a rear end of said horizontal cam slot portion;

wherein at least one of said guide pins moves horizontally and vertically between a first position and a second position along a guide surface connected to the mechanical chassis, a top of the guide pin being higher than a top of said reel mounts when the guide pin is at the first position on the guide surface, and the top of the guide pin being lower than the top of the reel mounts when the guide pin is at the second position on the guide surface, the second position being a refuge position for the guide pin; and, wherein the guide pin is at the first position on the guide surface when the magnetic tape is loaded onto the rotary magnetic cylinder and the guide pin is at the refuge position when the cassette is loaded onto said cassette holder, so that interference between the guide pins and a front of the cassette is avoided.

10. The magnetic tape recording and reproducing plug-in unit according to claim 9, wherein said case has a bottom panel;

wherein said recording and reproducing means is mounted on said bottom panel through said mechanical chassis and said mechanical chassis is inclined upwards at an angle of 30'~2° with respect to said bottom panel; and wherein a capstan motor is disposed in a space formed between said mechanical chassis and said bottom panel, the space being formed by the angle between the mechanical chassis and the bottom panel.

11. The magnetic tape recording and reproducing plug-in unit according to claim 9, wherein said case is about 102 mm in width and about 42 mm in height.

12. The magnetic tape recording and reproducing plug-in unit according to claim 9, wherein said top panel and said rear panel of said case are constructed as one body and attached to said side panels for free upward rotation.

13. The magnetic tape recording and reproducing plug-in unit according to claim 9, wherein said top panel of said case comprises a front portion and a rear portion, said rear portion and said rear panel being constructed as one body and attached to said side panels for free upward rotation.

14. The magnetic tape recording and reproducing plug-in unit according to claim 13, wherein said front portion and said front panel are constructed as one body and attached to said side panels for free upward rotation.

15. The magnetic tape recording and reproducing plug-in unit according to claim 9, wherein an antivibration member is interposed between said mechanical chassis and a bottom panel of the case.

* * * * *